US012173558B2

(12) United States Patent
Xu

(10) Patent No.: US 12,173,558 B2
(45) Date of Patent: Dec. 24, 2024

(54) SPRING ROLLER SHUTTER WITH ADJUSTABLE FUNCTION

(71) Applicant: Hangzhou Jichuan Technology Co., Ltd., Hangzhou (CN)

(72) Inventor: Shengping Xu, Hangzhou (CN)

(73) Assignee: Hangzhou Jichuan Technology Co., Ltd., Hangzhou (CN)

( * ) Notice: Subject to any disclaimer, the term of this patent is extended or adjusted under 35 U.S.C. 154(b) by 299 days.

(21) Appl. No.: 17/673,138

(22) Filed: Feb. 16, 2022

(65) Prior Publication Data

US 2023/0097525 A1 Mar. 30, 2023

(30) Foreign Application Priority Data

Sep. 30, 2021 (CN) .......................... 202111163737.1

(51) Int. Cl.
*E06B 9/60* (2006.01)
*E06B 9/42* (2006.01)
(Continued)

(52) U.S. Cl.
CPC .................. *E06B 9/60* (2013.01); *E06B 9/42* (2013.01); *A47H 1/04* (2013.01); *A47H 15/02* (2013.01);
(Continued)

(58) Field of Classification Search
CPC ..... E06B 9/60; E06B 9/40; E06B 9/42; E06B 2009/407; E06B 9/44; E06B 2009/2423; E06B 2009/2447; E06B 2009/2458; E06B 9/90; A47H 1/04; A47H 15/02; A47H 15/04; A47H 23/10
See application file for complete search history.

(56) References Cited

U.S. PATENT DOCUMENTS 1,550,701 A * 8/1925 Hoyt .......................... E06B 9/44 403/104
2,864,513 A * 12/1958 Novack .................. A47H 15/02 104/111
(Continued)

FOREIGN PATENT DOCUMENTS

CN 109915006 A 6/2019
CN 209011739 U 6/2019

OTHER PUBLICATIONS

The Office Action of DE patent application No. 10 2021 114 963.0 issued on May 14, 2024.

*Primary Examiner* — Abe Massad
*Assistant Examiner* — Matthew R. Shepherd
(74) *Attorney, Agent, or Firm* — Frank Niranjan

(57) ABSTRACT

The present application belongs to the field of spring roller shutters, and particularly relates to a spring roller shutter with adjustable function, which comprises a spring assembly in a drum, an adjusting assembly and a limiting assembly, wherein one end of the drum includes a concentric adjusting cylinder, the adjusting cylinder is connected with an output end of the spring assembly, one end of the adjusting cylinder away from the drum includes a fixed shell, the fixed shell includes a cavity with an opening facing the adjusting cylinder, the one end of the adjusting cylinder slides in the fixed shell, and the adjusting assembly and the limiting assembly are in the fixed shell, thereby achieving the benefit of adjusting the maximum withdrawal height of the curtain.

9 Claims, 3 Drawing Sheets

(51) Int. Cl.

| | |
|---|---|
| *A47H 1/04* | (2006.01) |
| *A47H 15/02* | (2006.01) |
| *A47H 23/10* | (2006.01) |
| *E06B 9/40* | (2006.01) |

(52) U.S. Cl.

CPC ........ *A47H 23/10* (2013.01); *E06B 2009/407* (2013.01)

(56) References Cited

U.S. PATENT DOCUMENTS

| | | | | |
|---|---|---|---|---|
| 3,698,036 | A * | 10/1972 | Goodman | E05D 15/0665 16/100 |
| 3,823,439 | A * | 7/1974 | Selset | A47H 1/08 16/95 D |
| 4,466,475 | A * | 8/1984 | Saito | E06B 9/90 160/297 |
| 4,733,435 | A * | 3/1988 | Darner | A47H 15/02 16/95 D |
| 4,915,153 | A * | 4/1990 | Toti | A47H 15/02 160/345 |
| 5,335,890 | A * | 8/1994 | Pryor | A47H 15/02 248/343 |
| 9,051,774 | B1 * | 6/2015 | Acker, Jr. | A47H 1/04 |
| 2007/0056698 | A1 * | 3/2007 | Lin | E06B 9/42 160/313 |
| 2015/0191973 | A1 * | 7/2015 | Bohlen | E06B 9/50 160/291 |
| 2018/0020860 | A1 * | 1/2018 | Thomas | A47H 1/08 160/23.1 |
| 2019/0055781 | A1 * | 2/2019 | Cheng | E06B 9/44 |

* cited by examiner

SPRING ROLLER SHUTTER WITH ADJUSTABLE FUNCTION

TECHNICAL FIELD

The present disclosure belongs to the field of spring roller shutters, and in particular, relates to the structural improvement of a spring roller shutter with adjustable functionality.

BACKGROUND

Spring roller shutters, named after the built-in spring device in the tube, are also called semi-automatic roller shutters. According to the different operating systems, spring roller shutters may be divided into traditional pull-cord spring roller shutters, pull-bead spring roller shutters, one-control two-type spring roller shutters, power-assisted spring roller shutters and so on.

At present, when the spring roller shutter is drawn back, the curtain cloth is usually completely rolled up to the roller, and the length of the curtain cloth bottom extending out of the roller is relatively short. However, during actual use, there are often some situations where it is not necessary to completely roll up the curtain. For example, some windows have window frames on the walls, and at this time, the roller shutter is often installed above the window frames, and when the curtain is completely rolled up, the window frames are exposed, which not only affects the beauty, but also easily generates noise due to collision with the window frame when the curtain rises. Or the curtain is likely to be out of reach after being completely rolled up because the installation position of the roller shutter is too high, or the curtain needs to shield sundries, sunlight and the like at the upper end according to specific personalized use requirements of users. However, the spring roller shutter in the prior art cannot adjust the structure of the maximum withdrawal height, and it is difficult to cope with these applications.

SUMMARY OF THE INVENTION

An object of the present invention is to provide a spring roller shutter with an adjustable function, which may adjust the maximum withdrawal height of a curtain or shade (hereinafter, "curtain"). In order to achieve the above objective, technical solutions adopted by the present invention are as follows.

The present invention provides a spring roller shutter with adjustable functionality. The spring roller shutter comprises a spring assembly in a drum a concentric adjusting cylinder, an adjusting assembly and a limiting assembly, wherein the concentric adjusting cylinder is at one end of the drum. The adjusting cylinder is connected to an output end of the spring assembly, and has one end away from the drum with a fixed shell. The fixed shell has a cavity with an opening facing the adjusting cylinder, and the end of the adjusting cylinder slides in the fixed shell. The adjusting assembly and the limiting assembly are also in the fixed shell.

The adjusting assembly is connected to the adjusting cylinder and is configured to move linearly as the adjusting cylinder rotates. The limiting assembly is configured to limit a distance by which the adjusting cylinder moves so as to limit the rotations of the adjusting cylinder.

In one embodiment, the spring roller shutter further comprises a telescopic rod, wherein the adjusting cylinder and the drum are rotatably sleeved at opposite ends of the telescopic rod.

In another embodiment, the adjusting assembly comprises a threaded ring sleeved on the telescopic rod and/or screwed to the telescopic rod. One end of the telescopic rod extends out of the adjusting cylinder and is fixed to the fixed shell. The end of the adjusting cylinder and the threaded ring are spaced by an interval. The adjusting cylinder may be connected to the threaded ring, and is configured to rotate the threaded ring when it (the adjusting cylinder) rotates.

In another embodiment, the threaded ring has a notch with a limiting rod therein. The limiting rod is fixed to the end of the adjusting cylinder away from the drum.

The limiting assembly comprises a limiting screw fixed to the fixed shell, with an end of the limiting screw in the fixed shell. The limiting screw is configured to limit movement of the threaded ring (e.g., when the threaded ring contacts the limiting screw).

In another embodiment, connecting rods are on the sides of the adjusting cylinder and the drum, fixed to the drum and slidably connected with the adjusting cylinder, and configured to support or hold a curtain thereon.

In other or further embodiments, the spring roller shutter further comprises a plurality of sliders, slidably connected to the connecting rods, configured to secure the curtain.

In further embodiments, the curtain may comprise blind parts and gauze parts. The blind parts and the gauze parts may alternate and the blind parts may be connected to the plurality of sliders.

In further embodiments, each of the plurality of the sliders has a sliding cavity, two ends with limiting openings in communication with the sliding cavity, two balls in the sliding cavity, and a limiting spring between the two balls. A part of each of the balls extends from or through a respective one of the limiting openings.

The connecting rods may have a rectangular shape or a U-shaped cross-section and may have an opening facing downwards. Inner walls of the connecting rods include first arc grooves that match or mate with the balls. The balls may roll or rotate in the first arc grooves.

In further embodiments, an outside of the adjusting cylinder includes a first groove, and the outside of the drum has a second groove. The connecting rods are in the first groove and the second groove, and are slidably connected with the adjusting cylinder through the first groove. Inner walls of the first groove include second arc grooves corresponding to the first arc grooves.

In further embodiments, an end of the drum away from the adjusting cylinder is rotatably connected to a connecting block, the connecting block is connected to the spring assembly, and fixed to a mounting bracket. The fixed shell is fixed to a vertical screw. The screw is slidably connected to the mounting bracket. A locking nut is on the screw.

The present disclosure has the following beneficial effects: the adjusting assembly is limited by the limiting assembly, the horizontal moving distance of the adjusting assembly is adjustable, the maximum number of rotations of the drum may be limited, and the maximum rising height of the bottom of the curtain is adjustable, thus achieving the beneficial effect of adjusting the maximum withdrawal height of the curtain cloth. Moreover, the overall distance or spacing between the drum and the adjusting cylinder is adjustable, which is convenient to adapt to roller shutters with different widths, and the overall width of the curtain may also be adjusted in the horizontal direction.

DETAILED DESCRIPTION

Next, technical solutions in embodiments of the present invention will be clearly and completely described with reference to FIG. 1 to FIG. 5. Obviously, the described embodiments are only part of the embodiments of the present disclosure. Unless otherwise specified, technical measures used in the embodiments are conventional and known to those skilled in the art.

In the present description, it shall be appreciated that orientations or positional relationships indicated by terms such as "longitudinal", "horizontal", "upper", "lower", "front", "back", "left", "right", "vertical", "horizontal", "top", "bottom", "inside" and "outside" are orientations or positional relationships shown in the attached drawings, and they are only used for convenience of description, and do not indicate or imply that the indicated device or element must have a specific orientation, or be constructed and operated in a specific orientation. Thus, these terms should not be construed as limitations to the present invention.

A spring roller shutter with adjustable functionality comprises a spring assembly 2 arranged in a drum 3, an adjusting cylinder 6 concentrically arranged at one end of the drum 3, and an adjusting assembly and a limiting assembly. The adjusting cylinder 6 is connected to an end of the spring assembly 2. One end of the adjusting cylinder 6 away from the drum 3 has a fixed shell 7. The fixed shell 7 has a cavity with an opening facing the adjusting cylinder 6. The end of the adjusting cylinder 6 slides in the fixed shell 7, and the adjusting assembly and the limiting assembly are in the fixed shell 7.

The adjusting assembly is connected to the adjusting cylinder 6, and is configured to move linearly (e.g., horizontally) as the adjusting cylinder 6 rotates. The limiting assembly is configured to limit the movement of the adjusting cylinder 6. In particular, the limiting assembly limits the rotation(s) of the adjusting cylinder 6.

Figure 1:
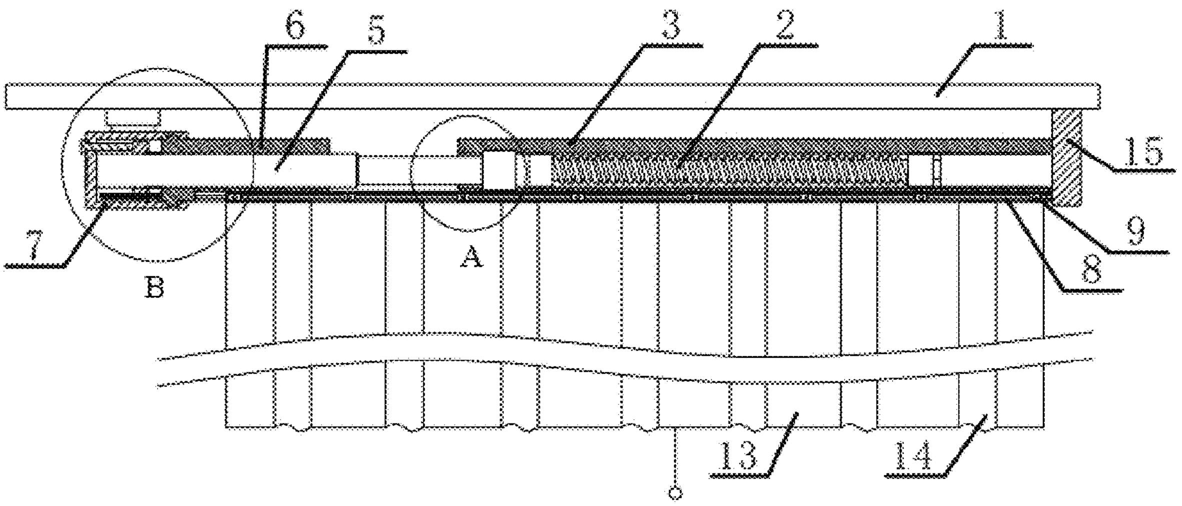
FIG. 1 is a schematic view of the overall structure of the present disclosure.
Figure 2:
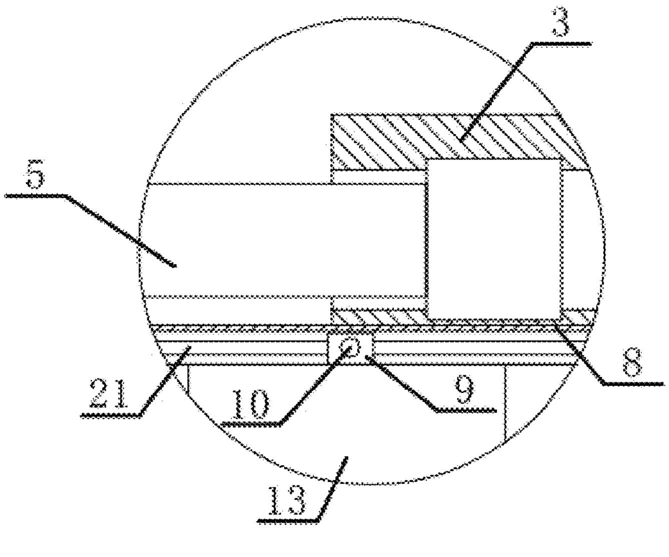
FIG. 2 is an enlarged schematic view at A in FIG. 1.

As shown in FIG. 1, the spring assembly 2 is a common component of a pull-cord spring roller shutter in the prior art. For example, it may adopt the spring withdrawal structure disclosed in CN201910118758.8. Specifically, the spring assembly 2 comprises a head, a spring supporting rod and a spring, wherein one end of the spring supporting rod is rotatably connected to the head, and another (e.g., the opposite) end thereof is fixed to a connecting block 15, which is in turn fixed to the bottom of a mounting bracket 1. The spring is sleeved on the spring supporting rod, two ends of the spring are fixed to the head and the spring supporting rod, and the outside of the head is clamped or otherwise secured to the inner wall of the drum 3 to achieve circumferential constraint. The drum 3 may have a curtain thereon, and the head may be a conventional head that automatically recovers (e.g., holds the curtain in place or rolls the curtain up) after the curtain is pulled to a pause or stop, then pulled again to activate a function of the head. When the drum 3 rotates, the spring is twisted by the head, so as to realize the withdrawal and stop of the curtain.

The adjusting cylinder 6 and the drum 3 are concentric cylindrical structures with the same diameter, connected to each other. When the drum 3 rotates, the adjusting cylinder 6 rotates together with the drum 3. The fixed shell 7 plays the role of supporting and rotatably connecting the adjusting cylinder 6, and the fixed shell 7 is connected to the mounting bracket 1. One end of the curtain is secured to the outside surfaces of the drum 3 and the adjusting cylinder 6, and the curtain generally hangs below the drum 3 and the adjusting cylinder 6. In specific implementations, the curtain is pulled downward slowly, and the drum 3 and the adjusting cylinder 6 rotate in one direction so that the curtain can function to shade or block light (e.g., from the sun). When the curtain is quickly pulled downward, under the combined action of the spring and the head, the drum 3 and the adjusting cylinder 6 rotate in the opposite direction, and the curtain is wound on the drum 3 and the adjusting cylinder 6, thus completing the withdrawal ("roll-up") of the curtain.

During the withdrawal of the curtain, the adjusting cylinder 6 drives the adjusting assembly to move horizontally, and when the adjusting assembly abuts against the limiting assembly, the adjusting assembly is horizontally constrained. At this time, or in this position, the adjusting cylinder 6 cannot rotate further, thereby limiting the maximum rotation(s) of the adjusting cylinder 6, and thus limiting the maximum height of the bottom of the curtain (i.e., the length of the curtain can be pulled in or rolled up). As compared to the prior art where the curtain can only be completely wound on the drum 3 when the curtain is withdrawn or rolled up, the present invention limits the adjusting assembly through the limiting assembly, and the distance that the adjusting assembly can move can be adjusted, thereby limiting the maximum rotations of the drum 3, and further limiting the maximum distance that the bottom of the curtain can rise up. When the spring roller shutter is installed in a window frame, the upper part of the window may be covered all the time by the spring roller shutter, or a redundant wall may be hidden by the spring roller shutter, and the situation where the roller shutter is too high to reach may also be avoided.

In some embodiments, the spring roller shutter further comprises a telescopic rod 5, and the adjusting cylinder 6 and the drum 3 are rotatably sleeved at opposite ends of the telescopic rod 5.

The telescopic rod 5 may be conventional, and has a telescopic function, so that the overall length of the adjusting cylinder 6 and the drum 3 may be adjusted. The telescopic function is convenient to adapt to curtains with different widths when the room is re-decorated, or when the spring roller shutter is reallocated to another window.

In another embodiment, the adjusting assembly comprises a threaded ring 19. The threaded ring 19 may be sleeved on the telescopic rod 5 and/or screwed onto the telescopic rod 5. The telescopic rod 5 extends out of the adjusting cylinder 6 and is fixed to the fixed shell 7. The end of the adjusting cylinder 6 and the threaded ring 19 are spaced by an interval, but adjusting cylinder 6 is connected to the threaded ring 19. The adjusting cylinder 6 is configured to rotate the threaded ring 19 until it contacts (e.g., abuts against) the limiting assembly.

The threaded ring 19 has a circular ring structure, and its inner side has internal threads. The telescopic rod 5 is in the fixed shell 7, and one end thereof extending out of the adjusting cylinder 6 has external threads. The threaded ring 19 is connected to the adjusting cylinder 6 in a relatively horizontal movement. When the adjusting cylinder 6 rotates, the threaded ring 19 rotates together with the adjusting cylinder 6 and moves horizontally under the action of threads. The limiting assembly adjusts the horizontal movement distance of the threaded ring 19, thereby limiting the maximum rotation(s) of the adjusting cylinder 6.

Specifically, the adjusting cylinder 6 is rotatably sleeved on the telescopic rod 5, the outside of the adjusting cylinder 6 has an annular convex part, and the inside of the fixed shell 7 has an annular groove. The annular convex part may rotate in the annular groove to restrict the axial direction of the adjusting cylinder 6, so that the adjusting cylinder 6 can only rotate but cannot move horizontally.

In further embodiments, the threaded ring 19 has a notch or hole with a limiting rod 20 therein. The limiting rod 20 is fixed or connected to the end of the adjusting cylinder 6 away from the drum 3, and the limiting rod 20 is in the notch or hole.

The limiting assembly comprises a limiting screw 18, which is screwed to the fixed shell 7. One end of the limiting screw is in the fixed shell 7, and the limiting screw 18 is configured to abut against and thus limit further movement of the threaded ring 19 (e.g., when the threaded ring 19 contacts the limiting screw 18).

Figure 3:
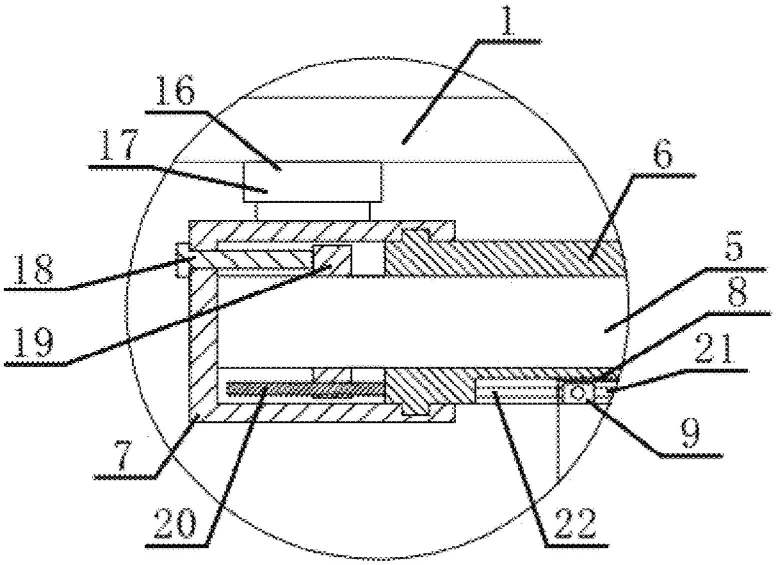
FIG. 3 is an enlarged schematic view at B in FIG. 1.

As shown in FIG. 3, the limiting screw 18 is horizontally configured, and the maximum distance that the threaded ring 19 may move horizontally may be changed by rotating the limiting screw 18 to change the length thereof in the fixed shell 7. The limiting rod 20 is horizontally configured, and is eccentrically configured with respect to the axis of the adjusting cylinder 6. The limiting rod 20 is driven by the adjusting cylinder 6 to rotate around the telescopic rod 5 in a circumferential direction, which then pushes the threaded ring 19 to rotate as a result of its insertion through the notch or hole. The threaded ring 19 may be clamped on the limiting rod 20 through the notch or hole, and it may move horizontally (e.g., along the telescopic rod 5).

In other or further embodiments, one or more connecting rods 8 are on the sides of (e.g., below) the adjusting cylinder 6 and the drum 3, fixed to the drum 3 and slidably connected to the adjusting cylinder 6, and configured to bear the curtain or shade thereon.

Furthermore, the connecting rod(s) 8 may include a plurality of sliders 9, which may be slidably connected to the connecting rod(s) 8 and which fasten or secure the curtain to the connecting rod(s) 8, and thus, the adjusting cylinder 6 and the drum 3.

Specifically, the curtain is connected to the adjusting cylinder 6 and the drum 3 through the connecting rod(s) 8, and the top of the curtain is slidably connected to the connecting rod(s) 8 through the sliders 9. The curtain may be horizontally separated into two or more parts.

The connecting rod 8 plays the role of connecting the adjusting cylinder 6 and the drum 3 in the circumferential or horizontal direction, so that the adjusting cylinder 6 rotates with the drum 3 in the circumferential direction.

Furthermore, the curtain may comprise multiple blind parts 13 and multiple gauze parts 14, arranged side by side and which may alternate. The tops of the multiple blind parts 13 may be fixed to the plurality of sliders 9.

Specifically, the blind parts 13 may be made of a conventional hard fabric such as PVC, and the gauze parts 14 may be made of a soft, flexible and foldable material such as a conventional gauze. The sliders 9 correspond to the blind parts 13 in one-to-one correspondence. By sliding the sliders 9, the overall width of the curtain may be changed in the horizontal direction. In specific implementations, the blind parts 13 are horizontally slid so that the gauze parts 14 are bent and folded, and thus the curtain of the present invention are also adjustable in the horizontal direction. Part of the window may be exposed in the horizontal direction, and the blind parts 13 may not bend, so that the whole curtain is flat in the vertical plane, and the curtain may be effectively rolled up by the adjusting cylinder 6 and the drum 3 when being drawn upwards.

In another embodiment, each of the sliders 9 has a sliding cavity, and opposite ends or sides of each of the sliders 9 have limiting openings therein. Two balls 10 are in the sliding cavity, a limiting spring 11 is between the two balls 10, and a part of each ball 10 extends from or through a corresponding limiting opening.

The connecting rods 8 may have a rectangular shape or a U-shaped cross-section and have an opening facing downwards, and inner walls of the connecting rods 8 may include first arc grooves 21 that match or mate with the balls 10. The balls 10 may roll or rotate in the first arc grooves 21.

Figure 4:
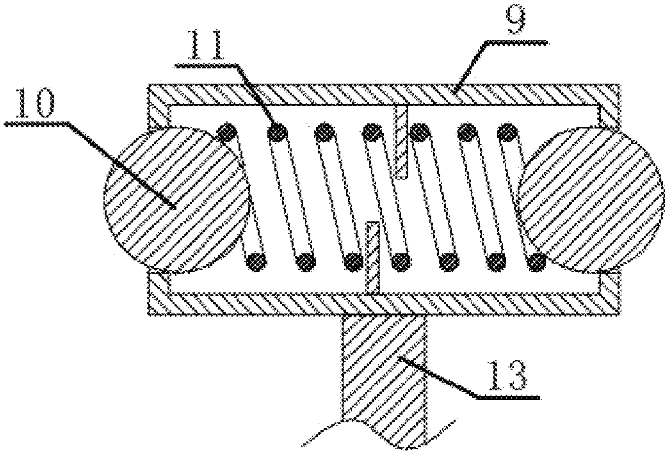
FIG. 4 is a schematic view of the cooperation between sliders and balls.
Figure 5:
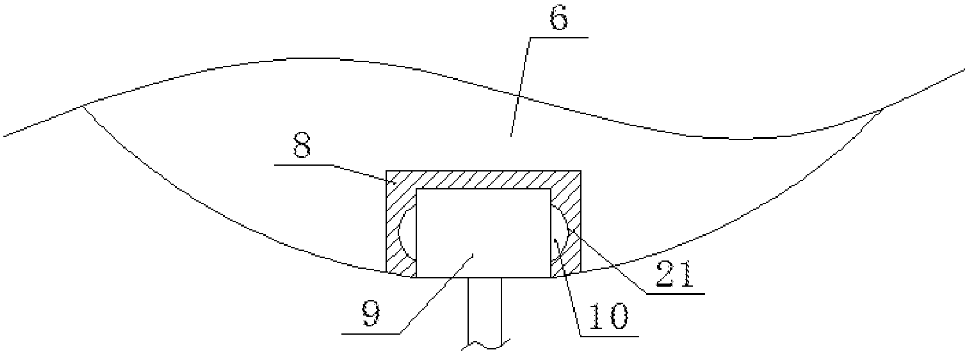
FIG. 5 is a schematic view of the cooperation between connecting rods and sliders.

As shown in FIG. 4, the limiting openings are on the horizontal sides of the slider 9, and the faces of the limiting openings are smaller than the equatorial faces (e.g., areas) of the balls 10, thereby limiting the balls 10 so that only a part thereof extends from the limiting openings. The limiting springs 11 are compressed to press the balls 10 on both sides against the limiting openings, as shown in FIG. 5. The balls 10 on both sides are in the two first arc grooves 21 inside the connecting rods 8 so as to restrict the sliders 9 in the vertical direction, so that the slider 9 can only slide horizontally. The elastic force of the limiting spring 11 is relatively large, and when the curtain is normally pulled to move downward, the sliders 9 cannot be taken out, and the sliders 9 can only be clamped and taken out downward using tools such as pliers. Thus, the sliders 9 and the curtain are detachable, and the curtain may be suitably replaced after adjusting the telescopic rod 5 to change the overall length of the adjusting cylinder 6 and the drum 3. The curtain and the sliders 9 are integral components that may be mass produced.

In other embodiments, the outside of the adjusting cylinder 6 has a first groove, the outside of the drum 3 has a second groove. The connecting rods 8 are configured in the first groove and the second groove. The connecting rods 8 are slidably connected to the adjusting cylinder 6 through the first groove, and inner walls of the first groove include second arc grooves 22 corresponding to the first arc grooves 21.

Specifically, the structure of the second arc grooves 22 is the same as that of the first arc grooves 21, the position of the second arc grooves 22 corresponds to that of the first arc grooves 21, and the thickness of the connecting rod 8 is relatively small. When the telescopic rod 5 changes the overall length of the adjusting cylinder 6 and the drum 3 (for example, after the overall length is increased), and the curtain with corresponding length or width is installed, the sliders 9 at the end of the connecting rod 8 closest to the adjusting cylinder 6 are in the second arc grooves 22 because the length of the connecting rod 8 is unchanged. When the curtain is moved to the right, the sliders 9 slide from the second arc grooves 22 into the first arc grooves 21, and the limiting spring 11 is always in a compressed state, so that the balls 10 may freely slide along the second arc grooves 22 and the first arc grooves 21, thus adapting curtains of different widths.

In some other embodiments, one end of the drum 3 away from the adjusting cylinder 6 is rotatably connected to a connecting block 15, the connecting block 15 is connected with the spring assembly 2, and the connecting block 15 is fixed to a mounting bracket 1. The fixed shell 7 is fixed to a vertically arranged screw 16, the screw 16 is slidably connected to the mounting bracket 1, and a locking nut 17 is configured on the screw 16.

Specifically, the screw 16 may be slidably connected to the mounting bracket 1 through a sliding rail, and the locking nut 17 abuts against the sliding end of the sliding rail and the bottom of the mounting bracket 1, thereby generating a pressing force and limiting the sliding of the screw 16. When the overall length of the adjusting cylinder 6 and the drum 3 is adjusted, the fixed shell 7 may be slid simply by loosening the locking nut 17. The mounting bracket 1 may be conventional, and it is used for mounting the spring roller shutter on the wall.

What described above are only the embodiments of the present invention, but are not intended to limit the scope of the present invention. Any equivalent structures or equivalent process flow modifications that are made according to the specification and the attached drawings of the present disclosure, or any direct or indirect applications of the present disclosure in other related technical fields shall all be covered within the scope of the present invention.

What is claimed is:

1. A spring roller shutter with adjustable functionality, comprising a spring assembly (2) in a drum (3), a concentric adjusting cylinder (6) at one end of the drum (3), an adjusting assembly and a limiting assembly, wherein the adjusting cylinder (6) is connected to an output end of the spring assembly (2) and has one end away from the drum (3) with a fixed shell (7), the fixed shell (7) has a cavity with an opening facing the adjusting cylinder (6), the one end of the adjusting cylinder (6) slides in the fixed shell (7), and the adjusting assembly and the limiting assembly are in the fixed shell (7);

the adjusting assembly is connected to the adjusting cylinder (6) and is configured to move linearly as the adjusting cylinder (6) rotates, and the limiting assembly is configured to limit a distance by which the adjusting cylinder (6) moves so as to limit rotation of the adjusting cylinder (6);

wherein the spring roller shutter further comprises a connecting rod (8) provided on a side of the adjusting cylinder (6) and a side of the drum (3), wherein the connecting rod (8) is fixed to the drum (3) and slidably connected with the adjusting cylinder (6), and configured to support or hold a curtain thereon.

2. The spring roller shutter of claim 1, further comprising a telescopic rod (5), wherein the adjusting cylinder (6) and the drum (3) are rotatably sleeved at opposite ends of the telescopic rod (5).

3. The spring roller shutter of claim 2, wherein the adjusting assembly comprises a threaded ring (19) sleeved on and/or screwed to the telescopic rod (5), one of the opposite ends of the telescopic rod (5) extends from the adjusting cylinder (6) and is fixed to the fixed shell (7), the one end of the adjusting cylinder (6) and the threaded ring (19) are spaced by an interval, and the adjusting cylinder (6) is configured to rotate the threaded ring (19) when the adjusting cylinder (6) rotates.

4. The spring roller shutter of claim 3, wherein the threaded ring (19) includes a notch, and a limiting rod (20) is in the notch and is fixed to the one end of the adjusting cylinder (6);

the limiting assembly comprises a limiting screw (18) fixed to the fixed shell (7) with an end of the limiting screw (18) in the fixed shell (7), and the limiting screw (18) is configured to limit movement of the threaded ring (19).

5. The spring roller shutter of claim 1, further comprising a plurality of sliders (9) slidably connected to the connecting rod (8), wherein the plurality of sliders are configured to secure the curtain.

6. The spring roller shutter of claim 5, further comprising the curtain, wherein the curtain comprises blind parts (13) and gauze parts (14), the blind parts (13) and the gauze parts (14) alternate, and the blind parts (13) are connected to the plurality of sliders (9).

7. The spring roller shutter of claim 5, wherein each of the plurality of sliders (9) includes a sliding cavity, two ends with limiting openings in communication with the sliding cavity, two balls (10) in the sliding cavity, and a limiting spring (11) between the two balls (10), and a part of each of the balls (10) extends from or through a respective one of the limiting openings;

the connecting rod (8) has a rectangular shape or a U-shaped cross-section and have an opening facing downwards, and an inner wall of the connecting rod (8) includes a first arc groove (21) that matches or mates with the balls (10).

8. The spring roller shutter of claim 7, wherein an outside of the adjusting cylinder (6) includes a first groove, the outside of the drum (3) includes a second groove, the connecting rod (8) is in the first groove and the second groove, slidably connected with the adjusting cylinder (6) through the first groove.

9. The spring roller shutter of claim 1, wherein an end of the drum (3) away from the adjusting cylinder (6) is rotatably connected to a connecting block (15), the connecting block (15) is connected to the spring assembly (2) and fixed to a mounting bracket (1), the fixed shell (7) is fixed to a vertical screw (16), the screw (16) is slidably connected to the mounting bracket (1), and the spring roller shutter further comprises a locking nut (17) on the screw (16).

* * * * *